(12) United States Patent
Kurita et al.

(10) Patent No.: US 12,512,473 B2
(45) Date of Patent: Dec. 30, 2025

(54) METHOD OF MANUFACTURING POSITIVE ELECTRODE MATERIAL

(71) Applicant: FUJITSU LIMITED, Kawasaki (JP)

(72) Inventors: Tomochika Kurita, Kawasaki (JP); Kenji Homma, Atsugi (JP); Masaharu Hida, Atsugi (JP); Jyunichi Iwata, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/594,076

(22) Filed: Mar. 4, 2024

(65) Prior Publication Data

US 2024/0213472 A1 Jun. 27, 2024

Related U.S. Application Data (60) Division of application No. 16/986,320, filed on Aug. 6, 2020, now abandoned, which is a continuation of application No. PCT/JP2018/005102, filed on Feb. 14, 2018.

(51) Int. Cl.
| | |
|---|---|
| *H01M 4/58* | (2010.01) |
| *H01M 10/05* | (2010.01) |
| *H01M 10/0525* | (2010.01) |
| *H01M 4/02* | (2006.01) |

(52) U.S. Cl.
CPC ......... *H01M 4/58* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2012/0235082 A1  9/2012 Yamada et al.

FOREIGN PATENT DOCUMENTS

| CN | 103107332 | * | 5/2013 | ............. H01M 4/58 |
|---|---|---|---|---|
| CN | 103107332 B | | 10/2015 | |
| CN | 107381529 A | | 11/2017 | |
| JP | 2002-246025 A | | 8/2002 | |
| JP | 2016-38996 A | | 3/2016 | |
| WO | 2011/068255 A1 | | 6/2011 | |
| WO | 2013/035572 A1 | | 3/2013 | |

(Continued)

OTHER PUBLICATIONS

Kim Hyungsub et al., Neutron and x-ray diffraction study of pyrophosphate-based Li2-xMP2O7 (M=Fe, Co) for lithium rechargeable battery electrodes, Chemistry of Materials, vol. 23, May 14, 2011, pp. 3930-393. (Year: 2012).*

(Continued)

*Primary Examiner* — Barbara L Gilliam
*Assistant Examiner* — Angela J Martin
(74) *Attorney, Agent, or Firm* — Fujitsu Intellectual Property Center (57) ABSTRACT

A positive electrode material has diffraction peaks at $2\theta=13.1°\pm0.2°$, $14.0°\pm0.2°$, and $18.4°\pm0.2°$ in X-ray diffraction ($2\theta=5°$ to $90°$) using synchrotron radiation having a wavelength of 1 Å, has a monoclinic crystal structure belonging to a space group $P2_1/c$, and is represented by a composition formula $Li_{2-2x}Co_{1+x}P_2O_7$ ($-0.2 \leq x \leq 0.2$).

4 Claims, 8 Drawing Sheets

(56) References Cited

FOREIGN PATENT DOCUMENTS

| WO | 2014/181436 | A1 | 11/2014 |
| WO | 2015/056412 | A1 | 4/2015 |

OTHER PUBLICATIONS

Shin-ichi Nishimura et al., "New Lithium Iron Pyrophosphate as 3.5 V Class Cathode Material for Lithium Ion Battery", J. Am. Chem. Soc., vol. 132, No. 39, pp. 13596-13597, 2010 American Chemical Society (Cited in ISR).
International Search Report and Written Opinion of the International Searching Authority (Form PCT/ISA/210, 220, and 237), mailed in connection with PCT/JP2018/005102 and mailed May 22, 2018.
Kim, Hyungsub et al., "Neutron and X-ray Diffraction Study of Pyrophosphate-Based Li2-xMP2O7(M=Fe,Co) for Lithium Rechargeable Battery Electrodes", Chemistry of Materials, vol. 23, No. 17, Aug. 18, 2011, pp. 3930-3937, XP055833915.
Barpanda, Prabeer et al., "High-Voltage Pyrophosphate Cathodes", Advanced Energy Materials, Wiley-VCH Verlag GmbH & Co. KGAA, DE,[Online] vol. 2, No. 7, May 14, 2012, pp. 841-859, XP002690357.
Extended European Search Report mailed Sep. 1, 2021 for corresponding European Patent Application No. 18906527.9.
USPTO, Requirement for Restriction/Election, mailed Mar. 2, 2023, in connection with U.S. Appl. No. 16/986,320.
USPTO, Non-Final Rejection, mailed Mar. 29, 2023, in connection with U.S. Appl. No. 16/986,320.
USPTO, Final Rejection, mailed Aug. 14, 2023, in connection with U.S. Appl. No. 16/986,320.
USPTO, Non-Final Rejection, mailed Dec. 14, 2023, in connection with U.S. Appl. No. 16/986,320.

* cited by examiner

METHOD OF MANUFACTURING POSITIVE ELECTRODE MATERIAL

CROSS-REFERENCE TO RELATED APPLICATION

This application is a divisional application of U.S. application Ser. No. 16/986,320, filed Aug. 6, 2020, which is a continuation application of International Application PCT/JP2018/005102 filed on Feb. 14, 2018 and designated the U.S., the entire contents of which are incorporated herein by reference.

FIELD

The present embodiment relates to a positive electrode material and a method for manufacturing the same, a battery using the positive electrode material and a method for manufacturing the same, and an electronic device using the battery.

BACKGROUND

A secondary battery has been widely used as a storage battery used for a mobile phone, a mobile personal computer, a sensing device, an electric vehicle, or the like. Examples of the secondary battery include a nickel-hydrogen battery, a nickel-cadmium battery, and a lithium ion battery. Among these batteries, a lithium ion battery is drawing attention because of having a high energy density.

Related art is disclosed in International Publication Pamphlet No. WO 2015/056412.

SUMMARY

According to an aspect of the embodiments, a positive electrode material has diffraction peaks at $2\theta=13.10\pm0.2°$, $14.0°\pm0.2°$, and $18.4°\pm0.2°$ in X-ray diffraction ($2\theta=5°$ to $90°$) using synchrotron radiation having a wavelength of 1 Å, has a monoclinic crystal structure belonging to a space group $P2_1/c$, and is represented by a composition formula $Li_{2-2x}Co_{1+x}P_2O_7$ ($-0.2 \leq x \leq 0.2$).

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A battery includes a positive electrode active material that performs a redox reaction in a positive electrode and includes a negative electrode active material that performs a redox reaction in a negative electrode. A lithium ion battery performs a redox reaction when releasing or storing lithium ions (for example, WO 2015/056412). The lithium ion battery includes a positive electrode active material capable of releasing or storing lithium ions in a positive electrode. In the lithium ion battery, lithium ions move back and forth between a positive electrode and a negative electrode, which is a redox reaction. Electrons move in association therewith, and electricity flows. By extracting this flowing electricity from the lithium ion battery, the lithium ion battery exhibits its function.

Examples of a positive electrode material currently in practical use and an energy density thereof include $LiCoO_2$ (570 Wh/kg), $LiFePO_4$ (530 Wh/kg), and $LiMn_2O_4$ (590 Wh/kg). That is, the energy density of the positive electrode material currently in practical use is within a range of 500 Wh/kg to 600 Wh/kg. However, since these energy densities are not sufficient for further downsizing a battery, development of a novel positive electrode material having a higher energy density than these materials is desired.

A positive electrode material having a high energy density and a method for manufacturing the same, and a battery using the positive electrode material and a method for manufacturing the same may be provided.

(Positive Electrode Material)

An aspect of a disclosed positive electrode material is represented by $Li_{2-2x}Co_{1+x}P_2O_7$ ($-0.2 \leq x \leq 0.2$).

The aspect of the positive electrode material has a monoclinic crystal structure and belongs to a space group $P2_1/c$.

The aspect of the positive electrode material has diffraction peaks at $2\theta=13.1°\pm0.2°$, $14.0°\pm0.2°$, and $18.4°\pm0.2°$ in X-ray diffraction ($2\theta=5°$ to $90°$) using synchrotron radiation having a wavelength of 1.

Another aspect of the disclosed positive electrode material is represented by $Li_{2-2x}Fe_{1+x}P_2O_7$ ($-0.2 \leq x \leq 0.2$).

The other aspect of the positive electrode material has a monoclinic crystal structure and belongs to the space group $P2_1/c$.

The other aspect of the positive electrode material has diffraction peaks at $2\theta=13.1°\pm0.2°$, $14.0°\pm0.2°$, and $18.4°\pm0.2°$ in X-ray diffraction ($2\theta=5°$ to $90°$) using synchrotron radiation having a wavelength of 1 Å.

There have been various reports on a positive electrode material so far, and one of the reports is a report on crystalline $Li_2CoP_2O_7$(Kim, H. et al., Chemistry of Materials 2011, 23 (17), 3930-3937). The report describes that $Li_2CoP_2O_7$ theoretically has an energy density of 1,000 Wh/kg. This energy density is about twice the energy density of a conventional positive electrode material. There are the following two reasons why a large energy density is expected in this way.

A voltage is as high as 4.9 V.

If it is assumed that all the lithium ions in a positive electrode material are used for charge/discharge as in formula (I) below, a capacity density is as large as 216 mAh/g.

$$Li_2CoP_2O_7 \Leftrightarrow CoP_2O_7 + 2Li^+ + 2e^- \quad \text{(I)}$$

However, at present, only a capacity density of 90 mAh/g, which is about 40% of a theoretical capacity density, can be verified.

Figure 1:
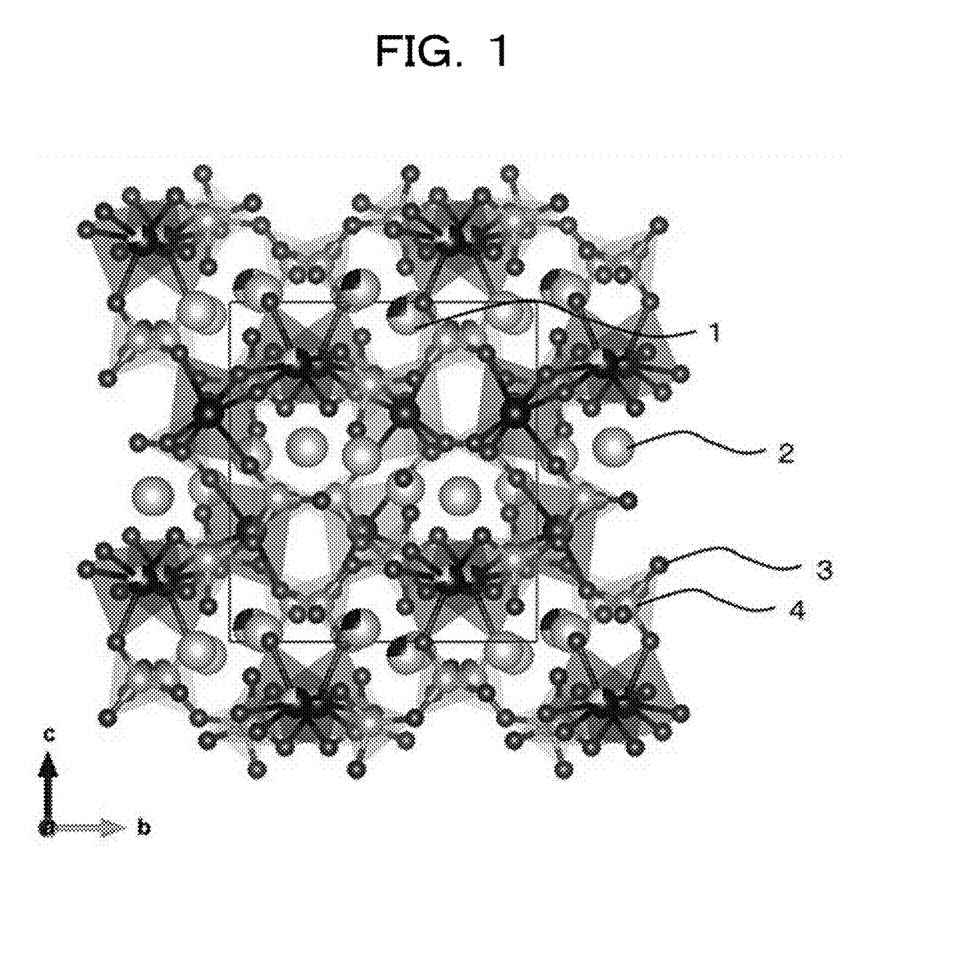
FIG. 1 is a schematic diagram illustrating a crystal structure of $Li_2CoP_2O_7$.

Therefore, the present inventors assumed that there was a problem in the crystal structure of Li$_2$CoP$_2$O$_7$(ICSD #261899) reported above. This crystal structure is illustrated in FIG. 1. In this crystal structure, a lithium atom or cobalt atom 1, a lithium atom 2, an oxygen atom 3, and a phosphorus atom 4 are arranged as illustrated in FIG. 1. Here, the lithium atom or cobalt atom 1 indicates that a unit cell in which an atom at a corresponding position is a lithium atom and a unit cell in which an atom at a corresponding position is a cobalt atom are mixed. Another feature of the crystal structure is that the lithium atom or cobalt atom 1 composes MO4 (quadra-coordinated unit) or MO5 (penta-coordinated unit) with the surrounding oxygen atom 3.

In a lithium ion battery, lithium atoms (lithium ions) move during charge or discharge. In a positive electrode, lithium ions are inserted into or discharged from a positive electrode material (positive electrode active material). Therefore, in order for a crystal of the positive electrode material to function as the positive electrode material (positive electrode active material), the crystal of the positive electrode material needs to be in the following state. Even if lithium atoms (lithium ions) that move during charge or discharge are inserted into or discharged from the crystal of the positive electrode material, it is necessary for the crystal structure of the positive electrode material not to change or to be able to reversibly change.

In Li$_2$CoP$_2$O$_7$, when some of lithium atoms are arranged at positions important for maintaining the crystal structure of Li$_2$CoP$_2$O$_7$, the lithium atoms are used only for maintaining the crystal structure. Therefore, the lithium atoms cannot be used for exchange between a positive electrode and a negative electrode during charge/discharge, in other words, for a redox reaction. This may be a reason why a theoretical capacity value cannot be verified in the reported positive electrode material.

Therefore, the present inventors studied Li$_2$CoP$_2$O$_7$ having different crystal structures. As a result, the present inventors have found Li$_2$CoP$_2$O$_7$ having the crystal structure illustrated in FIG. 2 and have completed the present invention.

Figure 2:
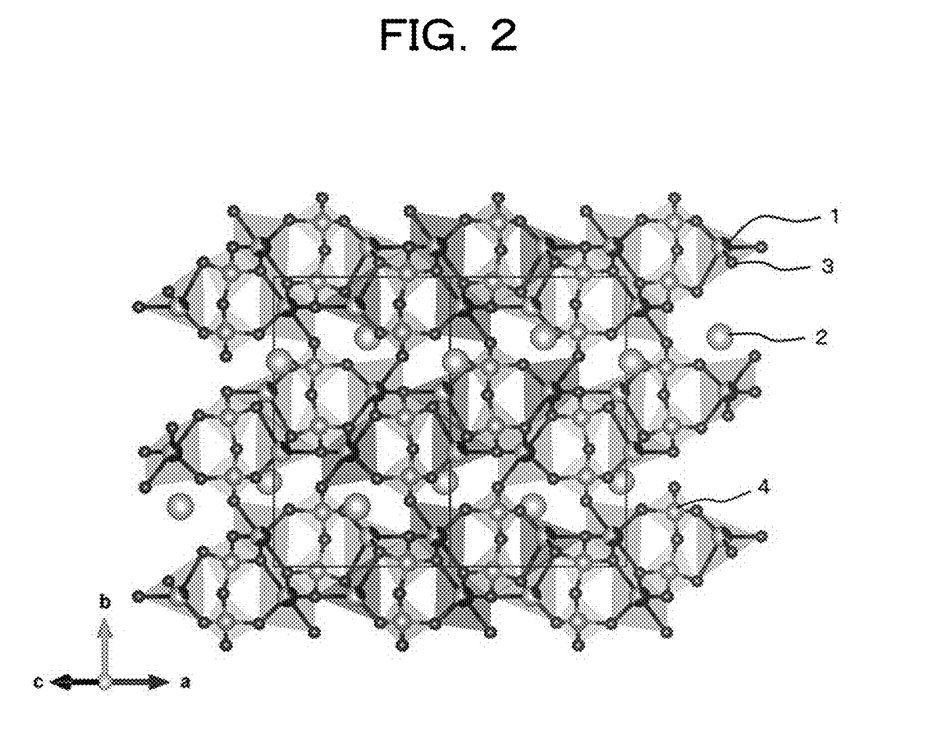
FIG. 2 is a schematic diagram illustrating a crystal structure of a disclosed positive electrode material.

Furthermore, the present inventors have found that Li$_2$FeP$_2$O$_7$ in which the cobalt atom is replaced with an iron atom in the crystal structure illustrated in FIG. 2 can also be used as the positive electrode material.

In the positive electrode material, the number of oxygen atoms coordinated to a cobalt atom or an iron atom is preferably 4 to 5.

The number of oxygen atoms coordinated to the cobalt atom or the iron atom can be calculated by estimating a distance between the cobalt atom and each of the oxygen atoms or a distance between the iron atom and each of the oxygen atoms in the crystal structure. The distance between the cobalt atom and each of the oxygen atoms or the distance between the iron atom and each of the oxygen atoms can be calculated by simulation from the height of a peak (peak intensity) in X-ray diffraction. For example, in the crystal structure of the disclosed positive electrode material, an ideal distance between the cobalt atom or the iron atom and each of the oxygen atoms is 2.2 Å to 2.8 Å. From this fact, it is possible to count the oxygen atoms located at a distance of 2.2 Å to 2.8 Å around the cobalt atom or the iron atom to count the oxygen atoms coordinated to the cobalt atom or the iron atom.

In FIG. 2, the polyhedron centered around the lithium or cobalt atom 1 is a polyhedron representing oxygen atoms located at a distance of 2.5 Å away from the cobalt atom.

<Peak of X-Ray Diffraction>

Among the positive electrode materials of the present invention, the positive electrode material represented by a composition formula Li$_{2-2x}$Co$_{1+x}$P$_2$O$_7$ ($-0.2 \leq x \leq 0.2$) has diffraction peaks at the following positions in X-ray diffraction ($2\theta=5°$ to $90°$) using synchrotron radiation having a wavelength of 1 Å.

$$2\theta = 13.1° \pm 0.2°, 14.0° \pm 0.2°, \text{ and } 18.4° \pm 0.2°$$

Figure 3:
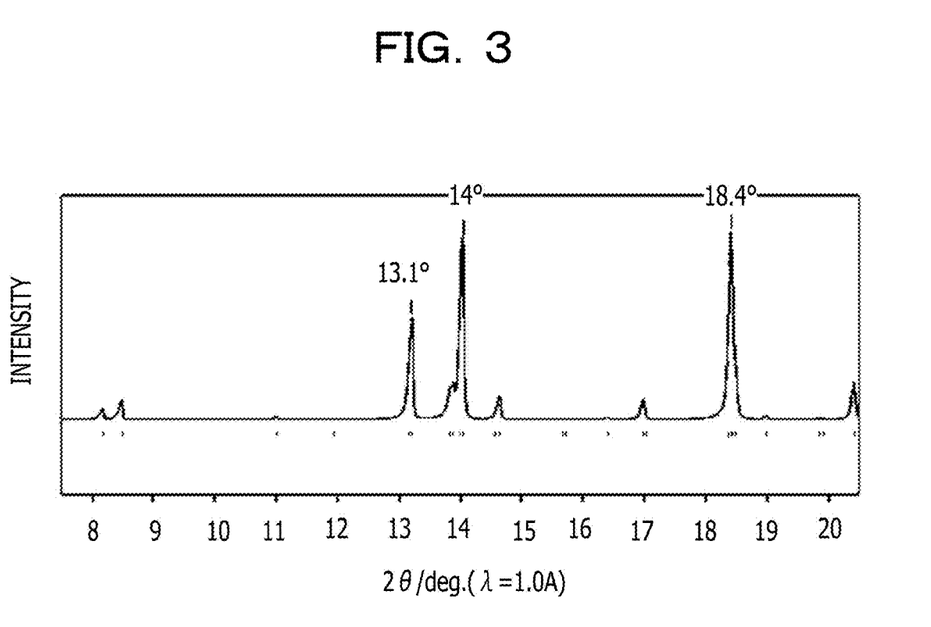
FIG. 3 is a part of an XRD spectrum of the disclosed positive electrode material.

FIG. 3 illustrates a portion of $2\theta=7.5°$ to $20.5°$ in the X-ray diffraction chart of the positive electrode material (Li$_2$CoP$_2$O$_7$) of the present invention. As illustrated in FIG. 3, among the several peaks, peaks with higher intensity than other peaks appear at $2\theta=13.1°\pm0.2°$, $14.0°\pm0.2°$, and $18.4°\pm0.2°$. Therefore, in X-ray diffraction, having diffraction peak at $2\theta=13.1°\pm0.2°$, $14.0°\pm0.2°$, and $18.4°\pm0.2°$ means that these peaks indicate extremely higher intensity than other peaks.

Among the positive electrode materials of the present invention, the positive electrode material represented by a composition formula Li$_{2-2x}$Fe$_{1+x}$P$_2$O$_7$ ($-0.2 \leq x \leq 0.2$) has diffraction peaks at the following positions in X-ray diffraction ($2\theta=5°$ to $90°$) using synchrotron radiation having a wavelength of 1 Å.

$$2\theta = 13.1° \pm 0.2°, 14.0° \pm 0.2°, \text{ and } 18.4° \pm 0.2°$$

As lattice constants of the positive electrode material, a=8.2 Å, b=13.5 Å, c=9.7 Å, and β=148° are preferably satisfied.

The lattice constants of the positive electrode material can be calculated from the X-ray diffraction data described above.

(Method for Manufacturing Positive Electrode Material)

A disclosed method for manufacturing a positive electrode material is not particularly limited and can be appropriately selected depending on a purpose, but the following method for manufacturing a positive electrode material is preferable.

An aspect of the disclosed method for manufacturing a positive electrode material includes a step of heat-treating a mixture of a lithium source, a cobalt source, and a phosphoric acid source, and further includes another step such as a mixing step, if necessary.

The aspect of the method for manufacturing a positive electrode material is a method for manufacturing a positive electrode material, satisfying the following (1) to (3).

(1) Represented by a composition formula Li$_{2-2x}$Co$_{1+x}$P$_2$O$_7$ ($-0.2 \leq x \leq 0.2$).
(2) Having a monoclinic crystal structure belonging to a space group P2$_1$/c.
(3) Having diffraction peaks at $2\theta=13.1°\pm0.2°$, $14.0°\pm0.2°$, and $18.4°\pm0.2°$ in X-ray diffraction ($2\theta=5°$ to $90°$) using synchrotron radiation having a wavelength of 1 Å.

Another aspect of the disclosed method for manufacturing a positive electrode material includes a step of heat-treating a mixture of a lithium source, an iron source, and a phosphoric acid source, and further includes another step such as a mixing step, if necessary.

The other aspect of the method for manufacturing a positive electrode material is a method for manufacturing a positive electrode material, satisfying the following (4) to (6).

(4) Represented by a composition formula $Li_{2-2x}Fe_{1+x}P_2O_7$ ($-0.2 \leq x \leq 0.2$).
(5) Having a monoclinic crystal structure belonging to a space group $P2_1/c$.
(6) Having diffraction peaks at $2\theta=13.1°\pm0.2°$, $14.0°\pm0.2°$, and $18.4°\pm0.2°$ in X-ray diffraction ($2\theta=5°$ to $90°$) using synchrotron radiation having a wavelength of 1 Å.

<Mixing Step>

The mixing step is not particularly limited as long as being a step of mixing a lithium source, a cobalt source, and a phosphoric acid source to obtain a mixture thereof, and can be appropriately selected depending on a purpose. For example, the mixing step can be performed using a planetary ball mill. When this mixing step is used, a positive electrode material represented by a composition formula $Li_{2-2x}Co_{1+x}P_2O_7$ is obtained.

The mixing step is not particularly limited as long as being a step of mixing a lithium source, an iron source, and a phosphoric acid source to obtain a mixture thereof, and can be appropriately selected depending on a purpose. For example, the mixing step can be performed using a planetary ball mill. When this mixing step is used, a positive electrode material represented by a composition formula $Li_{2-2x}Fe_{1+x}P_2O_7$ is obtained.

Examples of the lithium source include a lithium salt.

An anion constituting the lithium salt is not particularly limited and can be appropriately selected depending on a purpose. Examples of the anion include a hydroxide ion, a carbonate ion, an oxalate ion, an acetate ion, a nitrate anion, a sulfate anion, a phosphate ion, a fluorine ion, a chlorine ion, a bromine ion, and an iodine ion.

These anions may be used singly or in combination of two or more types thereof.

Furthermore, the lithium salt is not particularly limited and can be appropriately selected depending on a purpose. Examples of the lithium salt include lithium hydroxide (LiOH), lithium carbonate ($Li_2CO_3$), lithium nitrate ($LiNO_3$), lithium sulfate ($Li_2SO_4$), lithium perchlorate ($LiClO_4$), lithium hexafluorophosphate ($LiPF_6$), lithium tetrafluoroborate ($LiBF_4$), and the like. These salts may be hydrates or anhydrides. Among these salts, lithium carbonate and lithium nitrate are preferable because lithium carbonate and lithium nitrate do not cause a side reaction.

Examples of the cobalt source include a cobalt salt or the like.

An anion constituting the cobalt salt is not particularly limited and can be appropriately selected depending on a purpose. Examples of the anion include a carbonate ion, an oxalate ion, an acetate ion, a nitrate anion, a sulfate anion, a phosphate ion, a fluorine ion, a chlorine ion, a bromine ion, an iodine ion, and the like. These anions may be used singly or in combination of two or more types thereof.

Furthermore, the cobalt salt is not particularly limited and can be appropriately selected depending on a purpose. Examples of the cobalt salt include cobalt oxalate, cobalt nitrate, cobalt sulfate, cobalt chloride, and the like. These salts may be hydrates or anhydrides.

Examples of the iron source include an iron salt or the like.

An anion constituting the iron salt is not particularly limited and can be appropriately selected depending on a purpose. Examples of the anion include an oxide ion, a carbonate ion, an oxalate ion, an acetate ion, a nitrate anion, a sulfate anion, a phosphate ion, a fluorine ion, a chlorine ion, a bromine ion, an iodine ion, and the like.

These anions may be used singly or in combination of two or more types thereof.

Furthermore, the iron salt is not particularly limited and can be appropriately selected depending on a purpose. Examples of the iron salt include ferrous oxide, iron oxalate (II), iron nitrate (II), iron sulfate (II), iron chloride (II), and the like. These salts may be hydrates or anhydrides.

Examples of the phosphoric acid source include phosphoric acid, a phosphate, and the like.

A cation constituting the phosphate is not particularly limited and can be appropriately selected depending on a purpose. Examples of the cation include an ammonium ion or the like.

Examples of the phosphate include ammonium phosphate, ammonium dihydrogen phosphate, diammonium hydrogen phosphate, and the like.

Furthermore, instead of the lithium source and the phosphoric acid source, lithium phosphate, dilithium hydrogen phosphate, lithium dihydrogen phosphate, or the like may be used as a compound serving as the lithium source and the phosphoric acid source.

A ratio among the lithium source, the cobalt source, and the phosphoric acid source at the time of mixing is not particularly limited and can be appropriately selected depending on a purpose. Examples of the ratio include Li Co:P=1.6 to 2.4:0.8 to 1.2:2.0 (element ratio) or the like.

A ratio among the lithium source, the iron source, and the phosphoric acid source at the time of mixing is not particularly limited and can be appropriately selected depending on a purpose. Examples of the ratio include Li Fe:P=1.6 to 2.4:0.8 to 1.2:2.0 (element ratio) or the like.

<Heat Treatment Step>

The heat treatment step is not particularly limited as long as the above-described mixture is heat-treated, and can be appropriately selected depending on a purpose.

The number of times for performing the heat treatment step is not particularly limited and can be appropriately selected depending on a purpose, but is preferably two.

A first heat treatment step is performed in order to remove carbon dioxide and ammonia generated from the lithium source, the phosphoric acid source, the cobalt source, the iron source, and the like.

The temperature of the first heat treatment is not particularly limited and can be appropriately selected depending on a purpose, but is preferably 500° C. or higher and 720° C. or lower.

The time of the first heat treatment is not particularly limited and can be appropriately selected depending on a purpose, but is preferably one hour or more and 24 hours or less, more preferably two hours or more and 18 hours or less, and particularly preferably three hours or more and 15 hours or less.

A second heat treatment is performed in order to bring the mixture into a desired crystal structure. When the heat treatment is performed only once, the following conditions for the second heat treatment are used as heat treatment conditions.

The temperature of the second heat treatment is not particularly limited and can be appropriately selected depending on a purpose, but is preferably 420° C. or higher and 520° C. or lower, and more preferably 450° C. or higher and 510° C. or lower. When the heat treatment temperature is lower than 420° C. or higher than 520° C., the desired crystal structure cannot be necessarily obtained.

The time of the heat treatment is not particularly limited and can be appropriately selected depending on a purpose, but is preferably one hour or more and 24 hours or less.

The heat treatment is preferably performed in an inert atmosphere. Examples of the inert atmosphere include an argon atmosphere or the like.

(Battery)

A disclosed battery includes a positive electrode containing a positive electrode material, a negative electrode, and an electrolyte disposed between the positive electrode and the negative electrode, and further includes other members, if necessary.

An aspect of the battery includes a positive electrode containing a positive electrode material satisfying the following (1) to (3).

(1) Represented by a composition formula $Li_{2-2x}Co_{1+x}P_2O_7$ (−0.2≤x≤0.2).
(2) Having a monoclinic crystal structure belonging to a space group $P2_1/c$.
(3) Having diffraction peaks at 2θ=13.1°±0.2°, 14.0°±0.2°, and 18.4°±0.2° in X-ray diffraction (2θ=5° to 90°) using synchrotron radiation having a wavelength of 1.

The battery uses the disclosed positive electrode material having a high energy density. Therefore, the disclosed battery is a battery having a high energy density.

Another aspect of the battery includes a positive electrode containing a positive electrode material satisfying the following (4) to (6).

(4) Represented by a composition formula $Li_{2-2x}Fe_{1+x}P_2O_7$ (−0.2≤x≤0.2).
(5) Having a monoclinic crystal structure belonging to a space group $P2_1/c$.
(6) Having diffraction peaks at 2θ=13.1°±0.2°, 14.0°±0.2°, and 18.4°±0.2° in X-ray diffraction (2θ=5° to 90°) using synchrotron radiation having a wavelength of 1.

The battery includes, for example, at least a positive electrode, and further includes other members such as a negative electrode, an electrolyte, a separator, a positive electrode case, and a negative electrode case, if necessary.

<<Positive Electrode>>

The positive electrode contains at least the disclosed positive electrode material, and further contains another part such as a positive electrode current collector, if necessary.

In the positive electrode, the positive electrode material functions as a so-called positive electrode active material.

The content of the positive electrode material in the positive electrode is not particularly limited and can be appropriately selected depending on a purpose.

In the positive electrode, the positive electrode material may be mixed with a conductive material and a binder to form a positive electrode layer.

The conductive material is not particularly limited and can be appropriately selected depending on a purpose. Examples of the conductive material include a carbon-based conductive material or the like. Examples of the carbon-based conductive material include acetylene black, carbon black and the like.

The binder is not particularly limited and can be appropriately selected depending on a purpose. Examples of the binder include polytetrafluoroethylene (PTFE), polyvinylidene fluoride (PVDF), ethylene-propylene-butadiene rubber (EPBR), styrene-butadiene rubber (SBR), carboxymethyl cellulose (CMC), and the like.

The material, size, and structure of the positive electrode are not particularly limited and can be appropriately selected depending on a purpose.

The shape of the positive electrode is not particularly limited and can be appropriately selected depending on a purpose. Examples of the shape include a rod shape, a disk shape, and the like.

—Positive Electrode Current Collector—

The shape, size, and structure of the positive electrode current collector are not particularly limited and can be appropriately selected depending on a purpose.

The material of the positive electrode current collector is not particularly limited and can be appropriately selected depending on a purpose. Examples of the material include stainless steel, aluminum, copper, nickel, and the like.

The positive electrode current collector is used for favorably conducting a positive electrode layer to a positive electrode case that is a terminal.

<<Negative Electrode>>

The negative electrode contains at least a negative electrode active material, and further contains another part such as a negative electrode current collector, if necessary.

The size, and structure of the negative electrode are not particularly limited and can be appropriately selected depending on a purpose.

The shape of the negative electrode is not particularly limited and can be appropriately selected depending on a purpose. Examples of the shape include a rod shape, a disk shape, and the like.

—Negative Electrode Active Material—

The negative electrode active material is not particularly limited and can be appropriately selected depending on a purpose. Examples of the negative electrode active material include a compound containing an alkali metal element.

Examples of the compound containing an alkali metal element include a metal simple substance, an alloy, a metal oxide, a metal nitride, and the like.

Examples of the alkali metal element include lithium or the like.

Examples of the metal simple substance include lithium or the like.

Examples of the alloy include an alloy containing lithium or the like. Examples of the alloy containing lithium include a lithium aluminum alloy, a lithium tin alloy, a lithium lead alloy, a lithium silicon alloy, and the like.

Examples of the metal oxide include a metal oxide containing lithium or the like. Examples of the metal oxide containing lithium include lithium titanium oxide or the like.

Examples of the metal nitride include a metal nitride containing lithium, or the like. Examples of the metal nitride containing lithium include lithium cobalt nitride, lithium iron nitride, and lithium manganese nitride, and the like.

The content of the negative electrode active material in the negative electrode is not particularly limited and can be appropriately selected depending on a purpose.

In the negative electrode, the negative electrode active material may be mixed with a conductive material and a binder to form a negative electrode layer.

The conductive material is not particularly limited and can be appropriately selected depending on a purpose. Examples of the conductive material include a carbon-based conductive material or the like. Examples of the carbon-based conductive material include acetylene black, carbon black and the like.

The binder is not particularly limited and can be appropriately selected depending on a purpose. Examples of the binder include polytetrafluoroethylene (PTFE), polyvinylidene fluoride (PVDF), ethylene-propylene-butadiene rubber (EPBR), styrene-butadiene rubber (SBR), carboxymethyl cellulose (CMC), and the like.

—Negative Electrode Current Collector—

The shape, size, and structure of the negative electrode current collector are not particularly limited and can be appropriately selected depending on a purpose.

The material of the negative electrode current collector is not particularly limited and can be appropriately selected depending on a purpose. Examples of the material include stainless steel, aluminum, copper, nickel, and the like.

The negative electrode current collector is used for favorably conducting a negative electrode layer to a negative electrode case that is a terminal.

<<Electrolyte>>

The electrolyte is not particularly limited and can be appropriately selected depending on a purpose. Examples of the electrolyte include a non-aqueous electrolytic solution, a solid electrolyte, and the like.

—Non-Aqueous Electrolytic Solution—

Examples of the non-aqueous electrolytic solution include a non-aqueous electrolytic solution containing a lithium salt, an organic solvent, and the like.

——Lithium Salt——

The lithium salt is not particularly limited and can be appropriately selected depending on a purpose. Examples of the lithium salt include lithium hexafluorophosphate, lithium tetrafluoroborate, lithium perchlorate, lithium bis(pentafluoroethanesulfone) imide, lithium bis(trifluoromethanesulfone) imide, and the like. These lithium salts may be used singly or in combination of two or more types thereof.

The concentration of the lithium salt is not particularly limited and can be appropriately selected depending on a purpose, but is preferably 0.5 mol/L to 3 mol/L in the organic solvent from a viewpoint of ionic conductivity.

——Organic Solvent——

The organic solvent is not particularly limited and can be appropriately selected depending on a purpose. Examples of the organic solvent include ethylene carbonate, dimethyl carbonate, propylene carbonate, diethyl carbonate, ethyl methyl carbonate, and the like. These organic solvents may be used singly or in combination of two or more types thereof.

The content of the organic solvent in the non-aqueous electrolytic solution is not particularly limited and can be appropriately selected depending on a purpose, but is preferably 75% by mass to 95% by mass, and more preferably 80% by mass to 90% by mass.

When the content of the organic solvent is less than 75% by mass, the viscosity of the non-aqueous electrolytic solution increases, and the wettability to an electrodes decreases. Therefore, the internal resistance of the battery may increase. When the content of the organic solvent is more than 95% by mass, the ionic conductivity may decrease, and an output of the battery may decrease. Meanwhile, when the content of the organic solvent is within the above-described more preferable range, high ionic conductivity can be maintained, the viscosity of the non-aqueous electrolytic solution can be suppressed, and the wettability to an electrode can be thereby maintained advantageously.

—Solid Electrolyte—

The solid electrolyte is not particularly limited and can be appropriately selected depending on a purpose. Examples of the solid electrolyte include an inorganic solid electrolyte, an intrinsic polymer electrolyte, and the like.

Examples of the inorganic solid electrolyte include a LISICON material, a perovskite material, and the like.

Examples of the intrinsic polymer electrolyte include a polymer or the like having an ethylene oxide bond.

The content of the electrolyte in the battery is not particularly limited and can be appropriately selected depending on a purpose.

<<Separator>>

The material of the separator is not particularly limited and can be appropriately selected depending on a purpose. Examples of the material include paper, cellophane, polyolefin nonwoven fabric, polyamide nonwoven fabric, glass fiber nonwoven fabric, and the like. Examples of the paper include kraft paper, vinylon mixed paper, synthetic pulp mixed paper, and the like.

The shape of the separator is not particularly limited and can be appropriately selected depending on a purpose. Examples of the shape include a sheet shape or the like.

The structure of the separator may be a single layer structure or a laminated structure.

The size of the separator is not particularly limited and can be appropriately selected depending on a purpose.

<<Positive Electrode Case>>

The material of the positive electrode case is not particularly limited and can be appropriately selected depending on a purpose. Examples of the material include copper, stainless steel, and a metal of stainless steel or iron plated with nickel or the like.

The shape of the positive electrode case is not particularly limited and can be appropriately selected depending on a purpose. Examples of the shape include a dish shape with a warped-up periphery and a shallow bottom, a bottomed cylinder shape, a bottomed prismatic column shape, and the like.

The structure of the positive electrode case may be a single layer structure or a laminated structure. Examples of the laminated structure include a three-layer structure of nickel, stainless steel, copper, and the like.

The size of the positive electrode case is not particularly limited and can be appropriately selected depending on a purpose.

<<Negative Electrode Case>>

The material of the negative electrode case is not particularly limited and can be appropriately selected depending on a purpose. Examples of the material include copper, stainless steel, and a metal of stainless steel or iron plated with nickel or the like.

The shape of the negative electrode case is not particularly limited and can be appropriately selected depending on a purpose. Examples of the shape include a dish shape with a warped-up periphery and a shallow bottom, a bottomed cylindrical shape, a bottomed prismatic shape, and the like.

The structure of the negative electrode case may be a single layer structure or a laminated structure. Examples of the laminated structure include a three-layer structure of nickel, stainless steel, copper, and the like.

The size of the negative electrode case is not particularly limited and can be appropriately selected depending on a purpose.

The shape of the battery is not particularly limited and can be appropriately selected depending on a purpose. Examples of the shape include a coin shape, a cylindrical shape, a rectangular shape, a sheet shape, and the like.

Figure 4:
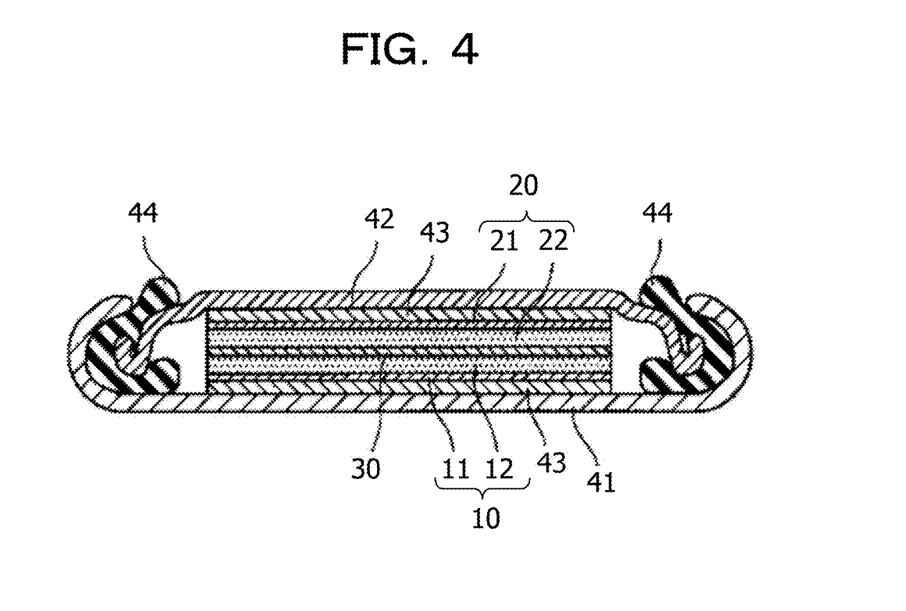
FIG. 4 is a schematic cross-sectional view illustrating an example of a disclosed battery.

An example of the disclosed lithium ion secondary battery will be described with reference to a drawing. FIG. 4 is a schematic cross-sectional view illustrating a lithium ion secondary battery which is an example of the disclosed battery.

The lithium ion secondary battery illustrated in FIG. 4 is a coin type lithium ion secondary battery. The coin type lithium ion secondary battery includes a positive electrode 10 including a positive electrode current collector 11 and a positive electrode layer 12, a negative electrode 20 including a negative electrode current collector 21 and a negative electrode layer 22, and an electrolyte layer 30 interposed between the positive electrode 10 and the negative electrode 20. In the lithium ion secondary battery of FIG. 4, the positive electrode current collector 11 and the negative electrode current collector 21 are fixed to a positive electrode case 41 and a negative electrode case 42 via a current collector 43, respectively. A gap between the positive electrode case 41 and the negative electrode case 42 is sealed with a packing material 44, for example, made of polypropylene. The current collector 43 is used for filling a gap between the positive electrode current collector 11 and the positive electrode case 41 and a gap between the negative electrode current collector 21 and the negative electrode case 42 and achieving conduction.

Here, the positive electrode layer 12 is manufactured using the disclosed positive electrode material.

(Method for Manufacturing Battery)

A disclosed method for manufacturing a battery is a method for obtaining the above-described battery.

The disclosed method for manufacturing a battery is a method for manufacturing a battery including a positive electrode containing a positive electrode material, a negative electrode, and an electrolyte disposed between the positive electrode and the negative electrode.

An aspect of the method for manufacturing a battery includes a step of heat-treating a mixture of a lithium source, a cobalt source, and a phosphoric acid source to obtain a positive electrode material, and further includes another step such as a step of assembling a positive electrode, a negative electrode, and the like into a desired structure, if necessary.

In the aspect of the method for manufacturing a battery, the positive electrode material satisfies the following (1) to (3).

(1) Represented by a composition formula $Li_{2-2x}Co_{1+x}P_2O_7$ ($-0.2 \leq x \leq 0.2$).

(2) Having a monoclinic crystal structure belonging to a space group $P2_1/c$.

(3) Having diffraction peaks at $2\theta=13.1°\pm0.2°$, $14.0°\pm0.2°$, and $18.4°\pm0.2°$ in X-ray diffraction ($2\theta=5°$ to $90°$) using synchrotron radiation having a wavelength of 1.

The disclosed battery uses the disclosed positive electrode material having a high energy density. In addition, the disclosed battery then is a battery having a high energy density. Therefore, the disclosed method for manufacturing a battery is a method for obtaining a battery having a high energy density.

Another aspect of the method for manufacturing a battery includes a step of heat-treating a mixture of a lithium source, an iron source, and a phosphoric acid source to obtain a positive electrode material, and further includes another step such as a step of assembling a positive electrode, a negative electrode, and the like into a desired structure, if necessary.

In the other aspect of the method for manufacturing a battery, the positive electrode material satisfies the following (4) to (6).

(4) Represented by a composition formula $Li_{2-2x}Fe_{1+x}P_2O_7$ ($-0.2 \leq x \leq 0.2$).

(5) Having a monoclinic crystal structure belonging to a space group $P2_1/c$.

(6) Having diffraction peaks at $2\theta=13.1°\pm0.2°$, $14.0°\pm0.2°$, and $18.4°\pm0.2°$ in X-ray diffraction ($2\theta=5°$ to $90°$) using synchrotron radiation having a wavelength of 1 Å.

(Electronic Device)

A disclosed electronic device includes a battery and an electronic circuit, and further includes other members, if necessary.

<Battery>

The battery includes a positive electrode containing a positive electrode material, a negative electrode, and an electrolyte disposed between the positive electrode and the negative electrode, and further includes other members, if necessary.

The negative electrode, the electrolyte, and the other members are not particularly limited and can be appropriately selected depending on a purpose, but the above-described ones are preferably used.

An aspect of the battery includes a positive electrode containing a positive electrode material satisfying the following (1) to (3).

(1) Represented by a composition formula $Li_{2-2x}Co_{1+x}P_2O_7$ ($-0.2 \leq x \leq 0.2$).

(2) Having a monoclinic crystal structure belonging to a space group $P2_1/c$.

(3) Having diffraction peaks at $2\theta=13.1°\pm0.2°$, $14.0°\pm0.2°$, and $18.4°\pm0.2°$ in X-ray diffraction ($2\theta=5°$ to $90°$) using synchrotron radiation having a wavelength of 1 Å.

The battery uses the disclosed positive electrode material having a high energy density. Therefore, the disclosed battery is a battery having a high energy density. In addition, the disclosed electronic device includes a battery having a high energy density.

Another aspect of the battery includes a positive electrode containing a positive electrode material satisfying the following (4) to (6).

(4) Represented by a composition formula $Li_{2-2x}Fe_{1+x}P_2O_7$ ($-0.2 \leq x \leq 0.2$).

(5) Having a monoclinic crystal structure belonging to a space group $P2_1/c$.

(6) Having diffraction peaks at $2\theta=13.1°\pm0.2°$, $14.0°\pm0.2°$, and $18.4°\pm0.2°$ in X-ray diffraction ($2\theta=5°$ to $90°$) using synchrotron radiation having a wavelength of 1.

The shape and size of the battery are not particularly limited and can be appropriately selected depending on a purpose.

The number of batteries included in the electronic device is not particularly limited and can be appropriately selected depending on a purpose. For example, a battery pack including a plurality of batteries may be incorporated into the electronic device.

<Electronic Circuit>

The electronic circuit is electrically connected to the positive electrode and the negative electrode.

The material, shape, and size of the electronic circuit are not particularly limited and can be appropriately selected depending on a purpose.

The electronic circuit may include, for example, a central processing unit (CPU), a peripheral logic unit, an interface unit, and a storage unit, and may control the entire electronic device.

The electronic device is not particularly limited and can be appropriately selected depending on a purpose. Examples of the electronic device include the following devices. Examples of the electronic device include a notebook personal computer, a tablet computer, a mobile phone (such as a smartphone), a personal digital assistant (PDA), an imaging device (such as a digital still camera or a digital video camera), an audio device (such as a portable audio player), a game device, a cordless phone handset, an electronic book, an electronic dictionary, a radio, a headphone, a navigation system, a memory card, a pacemaker, a hearing aid, a lighting device, a toy, a medical device, and a robot.

Figure 8:
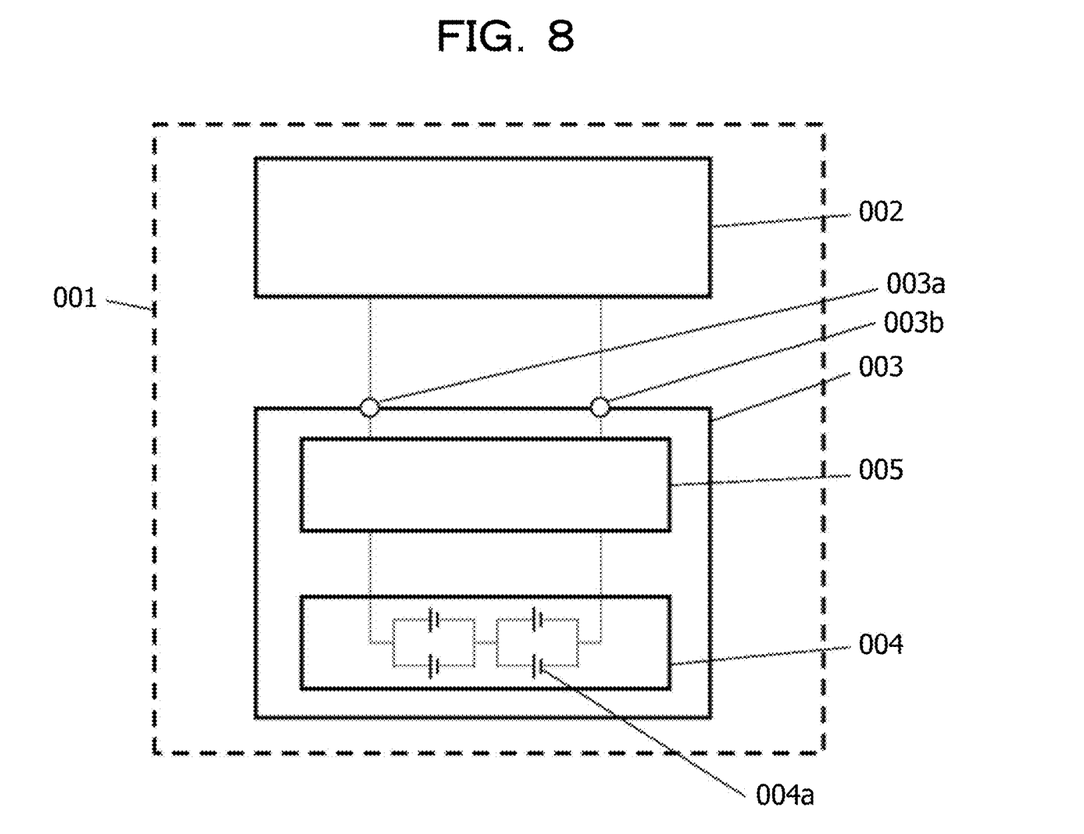
FIG. 8 is a schematic cross-sectional view illustrating an example of a disclosed electronic device.

An example of the disclosed electronic device will be described with reference to a drawing. FIG. 8 is a schematic cross-sectional view illustrating an example of the disclosed electronic device. An electronic device 001 includes an electronic circuit 002 which is a main body of the electronic device and a battery pack 003. The battery pack 003 is electrically connected to the electronic circuit 002 via a positive electrode terminal 003a and a negative electrode terminal 003b. The electronic device 001 has, for example, a configuration in which a user can attach and detach the battery pack 003. Note that the configuration of the electronic device 001 is not limited to this configuration, and may be a configuration in which the battery pack 003 is built in the electronic device 001 such that a user cannot remove the battery pack 003 from the electronic device 001.

The battery pack 003 includes an assembled battery 004 and a charge/discharge circuit 005. The assembled battery 004 is configured by connecting a plurality of secondary batteries 004a to each other in series and/or in parallel. The plurality of batteries 004a is connected to each other, for example, such that n batteries are arranged in parallel and m batteries are arranged in series (n and m are positive integers). As the battery 004a, the battery described above or a modification thereof is used. Instead of the assembled battery 004, only one secondary battery 004a may be included.

The electronic circuit 002 includes, for example, a central processing unit (CPU), a peripheral logic unit, an interface unit, and a storage unit, and controls the entire electronic device 001.

When the battery pack 003 is charged, the positive electrode terminal 003a and the negative electrode terminal 003b of the battery pack 003 are connected to a positive electrode terminal and a negative electrode terminal of a charger (not illustrated), respectively. Meanwhile, when the battery pack 003 is discharged (when the electronic device 001 is used), the positive electrode terminal 003a and the negative electrode terminal 003b of the battery pack 003 are connected to a positive electrode terminal and a negative electrode terminal of the electronic circuit 002, respectively.

During charge, the charge/discharge circuit 005 controls charge of the assembled battery 004. Meanwhile, during discharge (that is, when the electronic device 001 is used), the charge/discharge circuit 005 controls discharge of the electronic device 001.

EXAMPLES

Hereinafter, Examples of the disclosed technology will be described, but the disclosed technology is not limited to the following Examples.

The following raw materials used in Examples and Comparative Examples were obtained from each of the following companies for use.

Lithium carbonate: Kojundo Chemical Lab. Co., Ltd.
Cobalt oxalate dihydrate: Junsei Chemical Co., Ltd.
Iron oxalate dihydrate: Junsei Chemical Co., Ltd.
Diammonium hydrogen phosphate: Wako Pure Chemical Industries, Ltd.
Cobalt oxide: Sigma-Aldrich Japan Co., Ltd.

Example 1

<Preparation of Positive Electrode Material>

Lithium carbonate (2.96 g), cobalt oxalate dihydrate (7.32 g), and diammonium hydrogen phosphate (10.56 g) were put in a planetary ball mill container. Thereafter, the planetary ball mill container was disposed in a ball mill device, and the ball mill device was driven to mix the raw materials. The resulting mixture was fired at 600° C. for 12 hours in an argon atmosphere. The resulting fired product was pulverized with the planetary ball mill to obtain amorphous $Li_2CoP_2O_7$. The amorphous $Li_2CoP_2O_7$ was further annealed at 500° C. for 30 minutes in an argon atmosphere to obtain $Li_2CoP_2O_7$ having a crystal structure, which is a positive electrode material.

Figure 5:
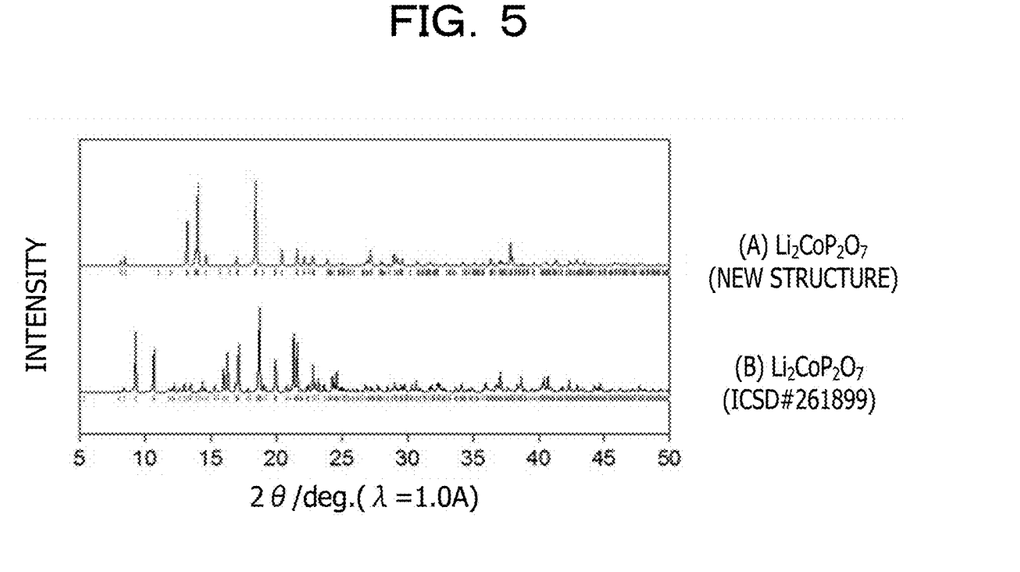
FIG. 5 illustrates XRD spectra of positive electrode materials in Example 1(A) and Comparative Example 1(B).

(A) of FIG. 5 illustrates a synchrotron radiation diffraction (X-ray diffraction) spectrum of the resulting positive electrode material at a wavelength of 1. The obtained spectrum had diffraction peaks with large intensity at 2θ=13.1°, 14.0°, and 18.4°. The crystal structure of $Li_2CoP_2O_7$ was analyzed using this spectrum. As a result, it was found that the crystal structure had a monoclinic crystal phase belonging to a space group $P2_1/c$. The lattice constants are as follows.

[Lattice constant]

$$a = 8.2 \text{ Å}$$
$$b = 13.5 \text{ Å}$$
$$c = 9.7 \text{ Å}$$
$$\beta = 148°$$

Example 2

Lithium carbonate (3.55 g), cobalt oxalate dihydrate (5.86 g), and diammonium hydrogen phosphate (10.56 g) were put in a planetary ball mill container. Thereafter, the planetary ball mill container was disposed in a ball mill device, and the ball mill device was driven to mix the raw materials. The resulting mixture was fired at 600° C. for 12 hours in an argon atmosphere. The resulting fired product was pulverized with the planetary ball mill to obtain amorphous $Li_{2.4}Co_{0.8}P_2O_7$. The amorphous $Li_{2.4}Co_{0.8}P_2O_7$ was further annealed at 500° C. for 30 minutes in an argon atmosphere to obtain $Li_{2.4}Co_{0.8}P_2O_7$ having a crystal structure, which is a positive electrode material.

The obtained positive electrode material was measured for synchrotron radiation diffraction (X-ray diffraction) at a wavelength of 1 Å. As a result, a diffraction pattern similar to that of (A) of FIG. 5 was obtained, and it was found that the crystal lattice was similar to that of the positive electrode material in Example 1.

Example 3

Lithium carbonate (2.37 g), cobalt oxalate dihydrate (8.78 g), and diammonium hydrogen phosphate (10.56 g) were put in a planetary ball mill container. Thereafter, the planetary ball mill container was disposed in a ball mill device, and the ball mill device was driven to mix the raw materials. The resulting mixture was fired at 600° C. for 12 hours in an argon atmosphere. The resulting fired product was pulverized with the planetary ball mill to obtain amorphous $Li_{1.6}Co_{1.2}P_2O_7$. The amorphous $Li_{1.6}Co_{1.2}P_2O_7$ was further annealed at 500° C. for 30 minutes in an argon atmosphere to obtain $Li_{1.6}Co_{1.2}P_2O_7$ having a crystal structure.

The obtained positive electrode material was measured for synchrotron radiation diffraction (X-ray diffraction) at a wavelength of 1 Å. As a result, a diffraction pattern similar to that of (A) of FIG. 5 was obtained, and it was found that the crystal lattice was similar to that of the positive electrode material in Example 1.

Comparative Example 1

Lithium carbonate (2.96 g), cobalt oxalate dihydrate (7.32 g), and diammonium hydrogen phosphate (10.56 g) were put in a planetary ball mill container. Thereafter, the planetary ball mill container was disposed in a ball mill device, and the ball mill device was driven to mix the raw materials. The resulting mixture was fired at 600° C. for 12 hours in an argon atmosphere to obtain $Li_2CoP_2O_7$ having a crystal structure, which is a positive electrode material.

(B) of FIG. 5 illustrates a synchrotron radiation diffraction experiment spectrum of the resulting positive electrode material at a wavelength of 1 Å. The obtained spectrum had diffraction peaks with large intensity at 2θ=9.3°, 10.7°, 16.3°, 17.1°, 18.7°, 21.3°, and 21.6°. The crystal structure of $Li_2CoP_2O_7$ was analyzed using this spectrum. As a result, it was found that the crystal structure had a monoclinic crystal phase belonging to a space group $P2_1/c$. The lattice constants are as follows.

[Lattice constant]

$$a = 9.8 \text{ Å}$$
$$b = 9.7 \text{ Å}$$
$$c = 11.0 \text{ Å}$$
$$\beta = 102°$$

Comparative Example 2

Lithium carbonate (2.96 g), cobalt oxalate dihydrate (7.32 g), and diammonium hydrogen phosphate (10.56 g) were put in a planetary ball mill container. Thereafter, the planetary ball mill container was disposed in a ball mill device, and the ball mill device was driven to mix the raw materials. The resulting mixture was fired at 600° C. for 12 hours in an argon atmosphere. The resulting fired product was pulverized with the planetary ball mill to obtain amorphous $Li_2CoP_2O_7$. The amorphous $Li_2CoP_2O_7$ was further annealed at 550° C. for 30 minutes in an argon atmosphere to obtain $Li_2CoP_2O_7$ having a crystal structure, which is a positive electrode material.

The obtained positive electrode material was measured for synchrotron radiation diffraction (X-ray diffraction) at a wavelength of 1 Å. As a result, a diffraction spectrum similar to that in Comparative Example 1 was obtained ((B) of FIG. 5). The crystal structure of $Li_2CoP_2O_7$ was analyzed using this spectrum. As a result, it was found that the crystal structure had a monoclinic crystal phase belonging to a space group $P2_1/c$. The lattice constants are as follows.

[Lattice constant]

$$a = 9.8 \text{ Å}$$
$$b = 9.7 \text{ Å}$$
$$c = 11.0 \text{ Å}$$
$$\beta = 102°$$

Comparative Example 3

$Li_2CO_3$ (1.1084 g), $Co_3O_4$ (2.4080 g), and $(NH_4)_2HPO_4$ (7.9234 g) weighed according to a stoichiometric ratio were put in a planetary ball mill container. Thereafter, the planetary ball mill container was disposed in a ball mill device, and the ball mill device was driven to mix the raw materials. The resulting mixture was fired at 1,100° C. in an argon atmosphere to obtain $LiCoP_2O_7$ which is a positive electrode material.

The obtained positive electrode material was measured for synchrotron radiation diffraction (X-ray diffraction) at a wavelength of 1 Å. Crystal analysis was performed using the obtained spectrum. As a result, it was found that the mixture was not a single phase mixture but a multiphase mixture of $Li_2CoP_2O_7$ and $LiCo_2P_3O_{10}$ (ICSD #82382), having a known structure.

Example 4

<Preparation of Half Cell>

A half cell was prepared using the positive electrode material (positive electrode active material) prepared in Example 1.

A mixed agent containing the positive electrode material, conductive carbon (Ketjen Black, Lion Co., ECP600JD), and polyvinylidene fluoride (Kureha Co., Ltd., KF #1300) at a mass ratio (positive electrode active material:conductive-carbon:polyvinylidene fluoride) of 85:10:5 was used as a positive electrode.

As an electrolytic solution, a 1 M solution obtained by dissolving lithium bis(trifluorosulfonyl) imide (LiTFSI) in 1-methyl-1-propylpyrrolidinium bis(trifluorosulfonyl) imide (MPPyr-TFSI) (purchased from Kishida Chemical Co., Ltd.) was used.

Metallic lithium was used as a negative electrode.

<Constant Current Charge/Discharge Test>

A constant current charge/discharge test was performed on the prepared half cell. Conditions of the constant current charge/discharge test are as follows.

Both charge and discharge were terminated at a voltage value. Charge was terminated at 5.7 V. Discharge was terminated at 2.0 V.

A discharge capacity of 160 mAh/g was obtained from the prepared half cell.

Figure 6:
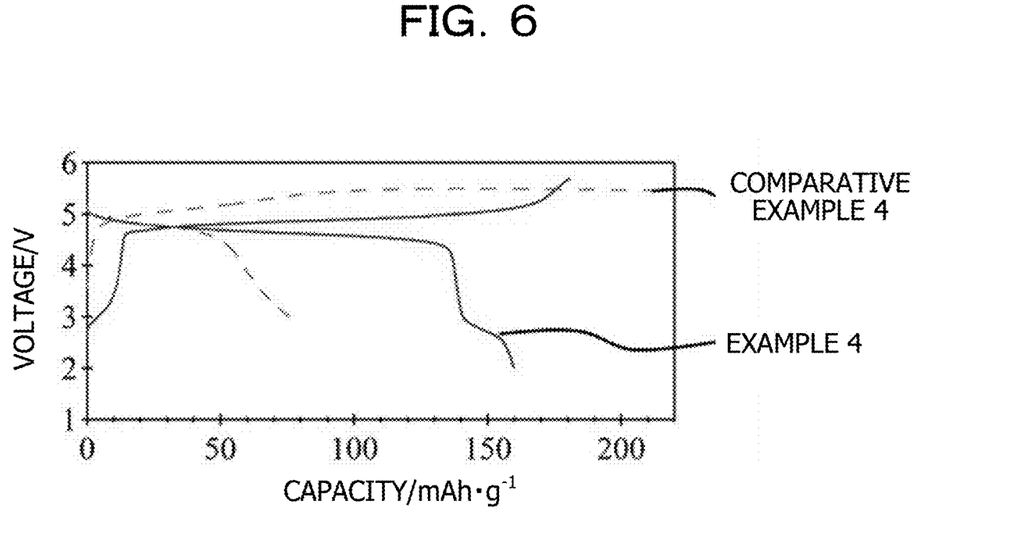
FIG. 6 illustrates constant current charge/discharge curves of half cells using positive electrode materials in Example 4 and Comparative Example 4.

FIG. 6 illustrates a constant current charge/discharge curve.

Comparative Example 4

<Preparation of Half Cell and Constant Current Charge/Discharge Test>

A half cell was prepared in a similar manner to Example 4 except that the positive electrode material in Example 4 was replaced with the positive electrode material prepared in Comparative Example 1.

A constant current charge/discharge test was performed on the prepared half cell. Conditions of the constant current charge/discharge test are as follows.

Both charge and discharge were terminated at a voltage value. Charge was terminated at 5.5 V. Discharge was terminated at 3.0 V.

A discharge capacity of 75 mAh/g was obtained from the prepared half cell.

FIG. 6 illustrates a constant current charge/discharge curve.

A discharge capacity of 160 mAh/g was obtained in Example 4, and a discharge capacity of 75 mAh/g was obtained in Comparative Example 4. The discharge capacity in Example 4 is about 74% of a theoretical capacity. This indicates that not all the lithium atoms are used for charge/discharge but the ratio of lithium atoms that can be used for charge/discharge has increased as compared with the conventional positive electrode material in Comparative Example 1.

Furthermore, from the results of Example 4, it was found that the energy density was 860 Wh/kg, and the energy density about 1.5 times that of the conventional positive electrode material was obtained.

In the positive electrode material of the present invention, the valence of Co changes with charge/discharge. Here, consideration will be given based on the result of Example 1 (discharge capacity 160 mAh/g) in a case of x=0.

A redox reaction of $Li_2CoP_2O_7$ during charge/discharge is expressed by the following formula.

$Li_2CoP_2O_7 \Leftrightarrow Li_{0.52}CoP_2O_7 + 1.48Li^+ + 1.48e^-$ This indicates that an average valence of Co changes within a range of 2 to 3.48 during charge/discharge.

Here, similarly, by assuming that the average valence of cobalt changes within a range of 2 to 3.48 during charge/discharge in a case of $-0.2 \leq x \leq 0.2$, a charge/discharge reaction and a capacity thereof in a case of x=−0.2 (Example 2) or +0.2 (Example 3) are simulated.

In a case of x=−0.2, reaction formula: $Li_{2.4}Co_{0.8}P_2O_7 \Leftrightarrow Li_{1.22}Co_{0.8}P_2O_7 + 1.18Li^+ + 1.18e^-$ is satisfied.

From this formula, a capacity was calculated to be 133 mAh/g.

In a case of x=+0.2, reaction formula: $Li_{1.6}Co_{1.2}P_2O_7 \Leftrightarrow Co_{1.2}P_2O_7 + 1.6Li^+ + 1.6e^-$ is satisfied.

From this formula, a capacity was calculated to be 168 mAh/g.

From the above results, it is estimated that each of the cases of x=−0.2 (Example 2) and +0.2 (Example 3) has a high discharge capacity. In addition, it can also be estimated that each of the cases of x=−0.2 (Example 2) and +0.2 (Example 3) has a high energy density because it is estimated that each of the cases has a high discharge capacity.

(Note that in a case of x=+0.2, the capacity is rate-determined by the content of lithium in the positive electrode material. Furthermore, in this case, an average valence of cobalt is within a range of 2 to 3.33.)

Example 5

Lithium carbonate (2.96 g), iron oxalate dihydrate (7.21 g), and diammonium hydrogen phosphate (10.56 g) were put in a planetary ball mill container. Thereafter, the planetary ball mill container was disposed in a ball mill device, and the ball mill device was driven to mix the raw materials. The resulting mixture was fired at 600° C. for 12 hours in an argon atmosphere. The resulting fired product was pulverized with the planetary ball mill to obtain amorphous $Li_2FeP_2O_7$. The amorphous $Li_2FeP_2O_7$ was further annealed at 500° C. for 30 minutes in an argon atmosphere to obtain $Li_2FeP_2O_7$ having a crystal structure, which is a positive electrode material.

The obtained positive electrode material was measured for synchrotron radiation diffraction (X-ray diffraction) at a wavelength of 1 Å. As a result, a diffraction pattern similar to that of (A) of FIG. 5 was obtained, and it was found that the positive electrode material had a single phase. The obtained spectrum had diffraction peaks with large intensity at 2θ=13.1°, 14.0°, and 18.4°. The crystal structure of $Li_2FeP_2O_7$ was analyzed using this spectrum. As a result, it was found that the crystal structure had a monoclinic crystal phase belonging to a space group $P2_1/c$. The lattice constants are as follows.

[Lattice constant]

$$a = 8.3 \text{ Å}$$
$$b = 13.6 \text{ Å}$$
$$c = 9.7 \text{ Å}$$
$$\beta = 148°$$

Example 6

A half cell was prepared in a similar manner to Example 4 except that the positive electrode material in Example 4 was replaced with the positive electrode material prepared in Example 5.

A constant current charge/discharge test was performed on the prepared half cell. Conditions of the constant current charge/discharge test are as follows.

Figure 7:
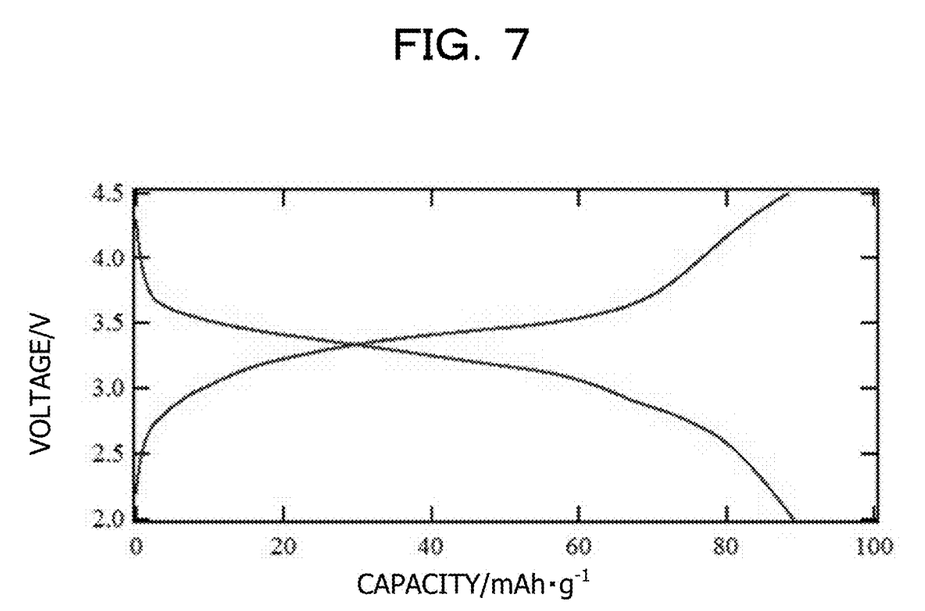
FIG. 7 illustrates a constant current charge/discharge curve of a half cell using a positive electrode material in Example 6.

Both charge and discharge were terminated at a voltage value. Charge was terminated at 4.5 V. Discharge was terminated at 2.0 V. As a result, a discharge capacity of 89 mAh/g was obtained. FIG. 7 illustrates a constant current charge/discharge curve.

Example 7

Using the half cell prepared in Example 4, a battery pack in which two half cells were arranged in parallel and three half cells were arranged in series was prepared. At this time, each of the half cells was fully charged by being connected to a charger in advance. When a constant current discharge test (terminated at 6.0 V) was performed on this battery pack, a plateau appeared in a region near 14 V.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method of manufacturing a positive electrode material, wherein the positive electrode material has diffraction peaks at 2θ=13.1°±0.2°, 14.0°±0.2°, and 18.4°±0.2° in X-ray diffraction (2θ=5° to 90°) using synchrotron radiation having a wavelength of 1 Å, has a monoclinic crystal structure belonging to a space group $P2_1/c$, and is represented by a composition formula $Li_{2-2x}Co_{1+x}P_2O_7$ (−0.2≤x≤0.2), the method comprising heat-treating a mixture of a lithium source, a cobalt source, and a phosphoric acid source, the heat treating includes:

a first heat-treating which is performed at 500° C. or higher and 720° C. or lower to remove carbon dioxide and ammonia from the lithium source, the cobalt source and the phosphoric acid source and obtain the mixture in which the carbon dioxide and ammonia are removed; and a second heat-treating which is performed at 420° C. or higher and 520° C. or lower and brings the mixture in which the carbon dioxide and ammonia are removed into a crystal structure.

2. The method of manufacturing a positive electrode material according to claim 1, wherein the heat-treating is performed in an inert atmosphere.

3. The method of manufacturing a positive electrode material according to claim 1, wherein the mixture is generated by putting the lithium source, the cobalt source and the phosphoric acid source in a planetary ball mill container, disposing the planetary ball mill container in a ball mill device and driving the ball mill device to mix the lithium source, the cobalt source and the phosphoric acid source.

4. The method of manufacturing a positive electrode material according to claim 3, wherein the method further includes pulverizing the mixture in which the carbon dioxide and ammonia are removed with a planetary ball mill to obtain the mixture in which the carbon dioxide and ammonia are removed and is amorphous.

* * * * *